United States Patent
Inoue

(10) Patent No.: US 7,609,458 B2
(45) Date of Patent: Oct. 27, 2009

(54) PROJECTION APPARATUS, ELEVATION ANGLE CONTROL METHOD THEREFOR AND RECORDING MEDIUM

(75) Inventor: Hideaki Inoue, Musashimurayama (JP)

(73) Assignee: Casio Computer Co., Ltd., Tokyo (JP)

( * ) Notice: Subject to any disclaimer, the term of this patent is extended or adjusted under 35 U.S.C. 154(b) by 140 days.

(21) Appl. No.: 11/655,481

(22) Filed: Jan. 19, 2007

(65) Prior Publication Data

US 2007/0171377 A1 Jul. 26, 2007

(30) Foreign Application Priority Data

Jan. 20, 2006 (JP) ............... 2006-012646

(51) Int. Cl.
*G02B 15/14* (2006.01)
(52) U.S. Cl. ...................................... 359/691
(58) Field of Classification Search .......... 359/649–751
See application file for complete search history.

(56) References Cited

U.S. PATENT DOCUMENTS

2003/0223049 A1* 12/2003 Ohara ........................ 353/101

FOREIGN PATENT DOCUMENTS

JP 2005-006228 A 1/2005

\* cited by examiner

*Primary Examiner*—Scott J Sugarman
*Assistant Examiner*—Vipin M Patel
(74) *Attorney, Agent, or Firm*—Frishauf, Holtz, Goodman & Chick, P.C.

(57) ABSTRACT

A projection apparatus includes a distance measuring unit that measures a distance to a screen on which an image is to be projected; a projection unit that has a zoom mechanism unit capable of changing a zoom magnification of a projection image, executes focusing based on the distance measured by the distance measuring unit and projects an image on the screen; and an elevation angle control unit that controls an elevation angle of the distance measuring unit based on the zoom magnification set by the zoom mechanism unit in such a way that a distance measuring center line of the distance measuring unit corresponds to a center point of a projection area of the projection image, wherein the center point of a projection area is determined according to the zoom magnification of the zoom mechanism unit.

10 Claims, 7 Drawing Sheets

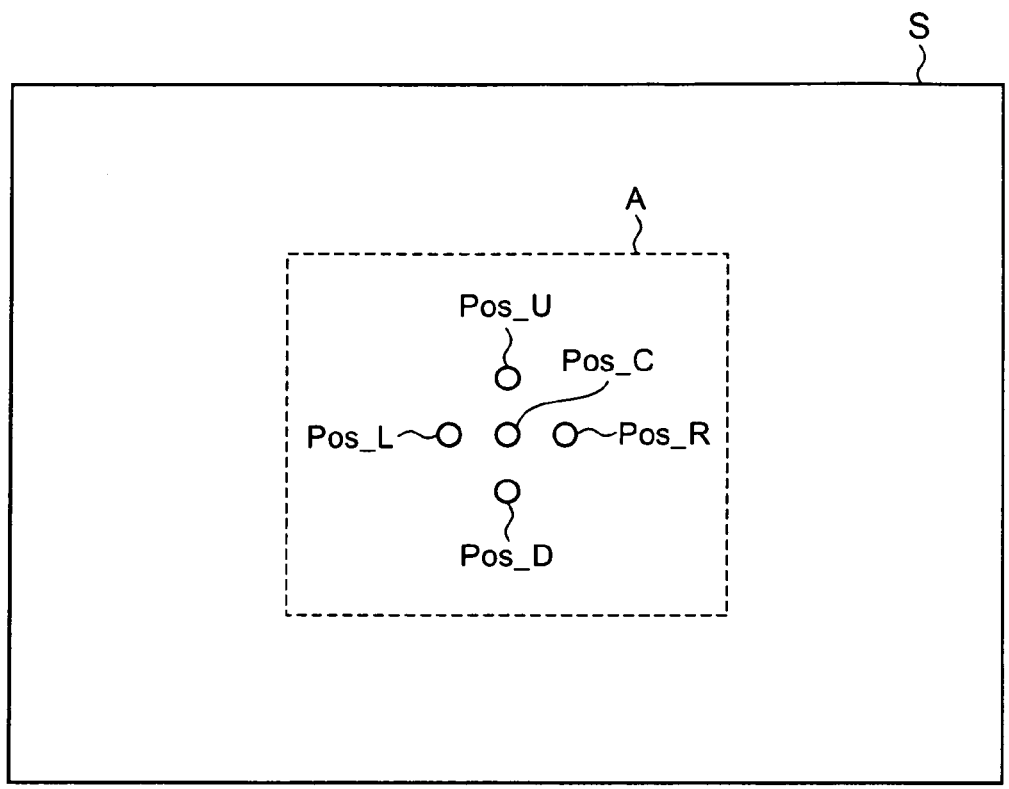

PROJECTION APPARATUS, ELEVATION ANGLE CONTROL METHOD THEREFOR AND RECORDING MEDIUM

BACKGROUND OF THE INVENTION

1. Field of the Invention

The present invention relates to a projection apparatus, an elevation angle control method therefor, and a recording medium.

2. Description of the Related Art

There exists a distance measuring apparatus or a distance measuring apparatus with an AF (Auto focus) sensor module for a projection apparatus (see, for example, Unexamined Japanese Patent Application KOKAI Publication No. 2005-6228).

On the other hand, projection apparatuses equipped with a zoom mechanism unit are increasingly becoming popular. Zooming is achieved by changing the focal distance of the projection apparatus, and the ratio of the focal distance when the zoom is set to the telescopic side to the focal distance when the zoom is set to the wide side, is called the zoom magnification.

Conventionally, in case a projection apparatus is configured in such-a way that a center of the display unit does not match with the optical axis of a projection lens, the center of the projection area of a projection apparatus will be shifted upward, as the zoom magnification is changed. That is, as best shown in FIG. 9, when the zoom magnification of the projector 51 (projection apparatus) is changed from telescopic to middle, and to wide mode, the projection area changes from Area_t(telescopic) to Area_m(middle), and to Area_w(wide), and accordingly the center of each projection area slightly shifts upward in the elevated (upward) direction.

Because the distance measuring apparatus is fixed at a given elevation angle, the direction to its distance measuring center does not change. With zoom being set to the telescopic mode, the center position of the projection area substantially matches with a position indicated by the direction to the distance measuring center. With zoom being set to the middle or the wide mode, however, the position indicated by the direction to the distance measuring center is shifted downward relative to the center of the projection area of Area_m or Area_w.

Auto focus control requires information on the distance to the center of the projection area. With the zoom set to the telescopic side, the distance to the center that is measured by the distance measuring apparatus substantially matches with the distance to the center position of the projection area. However, when the zoom is changed to the middle or to the wide side, the distance measuring apparatus will measure the distance to the position shifted from the center of the projection area rather than the distance to the center of the projection area. Accordingly, the distance to the center position of the projection area cannot be measured accurately, resulting in lower performance of auto focus control.

In view of the conventional problem, it is an object of the present invention to provide a projection apparatus, an elevation angle control method therefor and a recording medium, which can accurately measure a distance.

SUMMARY OF THE INVENTION

To achieve the above object according to a preferable mode of the invention, there is provided a projection apparatus comprising:

a distance measuring unit that measures a distance to a screen on which an image is to be projected;

a projection unit that has a zoom mechanism unit capable of changing a zoom magnification of a projection image, focuses the projection image based on the distance measured by the distance measuring unit and projects the image on the screen; and an elevation angle control unit that controls an elevation angle of the distance measuring unit based on the zoom magnification set by the zoom mechanism unit in such a way that a distance measuring center line of the distance measuring unit corresponds to a center point of a projection area of the projection image which is determined according to the zoom magnification of the zoom mechanism unit.

According to another preferable mode of the invention, there is provided a projection apparatus comprising:

a distance measuring unit that measures a distance to a screen on which an image is to be projected; and a projection unit that has a zoom mechanism unit capable of changing a zoom magnification of a projection image, focuses the projection image based on the distance measured by the distance measuring unit and projects the image on the screen; and the zoom mechanism unit of the projection unit controls a distance measuring range of the distance measuring unit in such a way that a center point of the distance measuring range of the distance measuring unit corresponds to a center point of a projection area of the projection image which is determined according to the set zoom magnification.

According to a further preferable mode of the invention, there is provided an elevation angle control method for a projection apparatus which projects an image on a screen, comprising the steps of:

setting a zoom magnification when projecting the image on the screen; and controlling an elevation angle of a distance measuring center line in such a way that a distance measuring center line extending to the screen corresponds to a center point of a projection area of a projection image to be determined according to the set zoom magnification.

According to a still further preferable mode of the invention, there is provided a computer readable recording medium storing a program for allowing a computer to execute:

a procedure of setting a zoom magnification when projecting the image on the screen; and controlling an elevation angle of a distance measuring center line in such a way that a distance measuring center line extending to the screen matches a center point of a projection area of a projection image to be determined according to the set zoom magnification.

According to a yet still further preferable mode of the invention, there is provided a projection apparatus comprising:

a distance measuring unit that measures a distance to a screen on which an image is to be projected; and a projection unit that has a zoom mechanism unit capable of changing a zoom magnification of a projection image, focuses the projection image based on the distance measured by the distance measuring unit and projects the image on the screen; and the zoom mechanism unit of the projection unit that controls a distance measuring area of the distance measuring unit in such a way that the distance measuring area of the distance measuring unit approaches the projection area of the projection image which is determined according to the set zoom magnification.

BRIEF DESCRIPTION OF THE DRAWINGS

The object and other objects and advantages of the present invention will become more apparent upon reading of the following detailed description and the accompanying drawings in which:

FIG. 3 is a diagram showing individual distance measuring points on a screen;

FIG. 4 is a diagram showing the relationship between a zoom magnification and an elevation angle recorded in a table, that is stored in a memory shown in FIG. 1;

DETAILED DESCRIPTION OF THE PREFERRED EMBODIMENT

A projector as a projection apparatus according to a preferred embodiment of the present invention will now be described with reference to the accompanying drawings.

Figure 1:
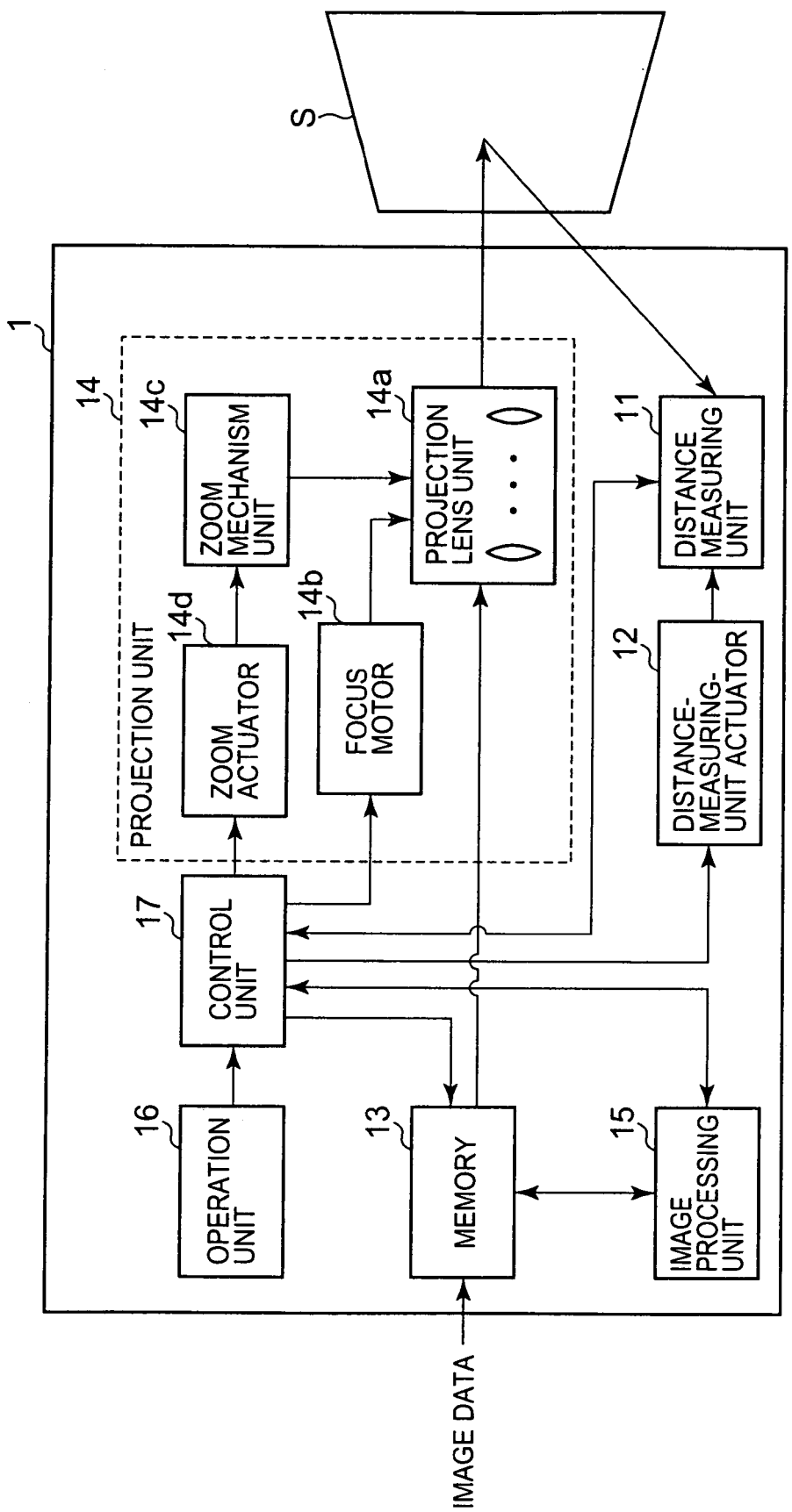
FIG. 1 is a block diagram showing the configuration of a projector according to one embodiment of the invention.

FIG. 1 shows the configuration of a projector 1 according to the embodiment.

The projector 1 of the embodiment includes a distance measuring unit 11, a distance-measuring-unit actuator 12, a memory 13, a projection unit 14, an image processing unit 15, an operation unit 16 and a control unit 17.

Figure 2:
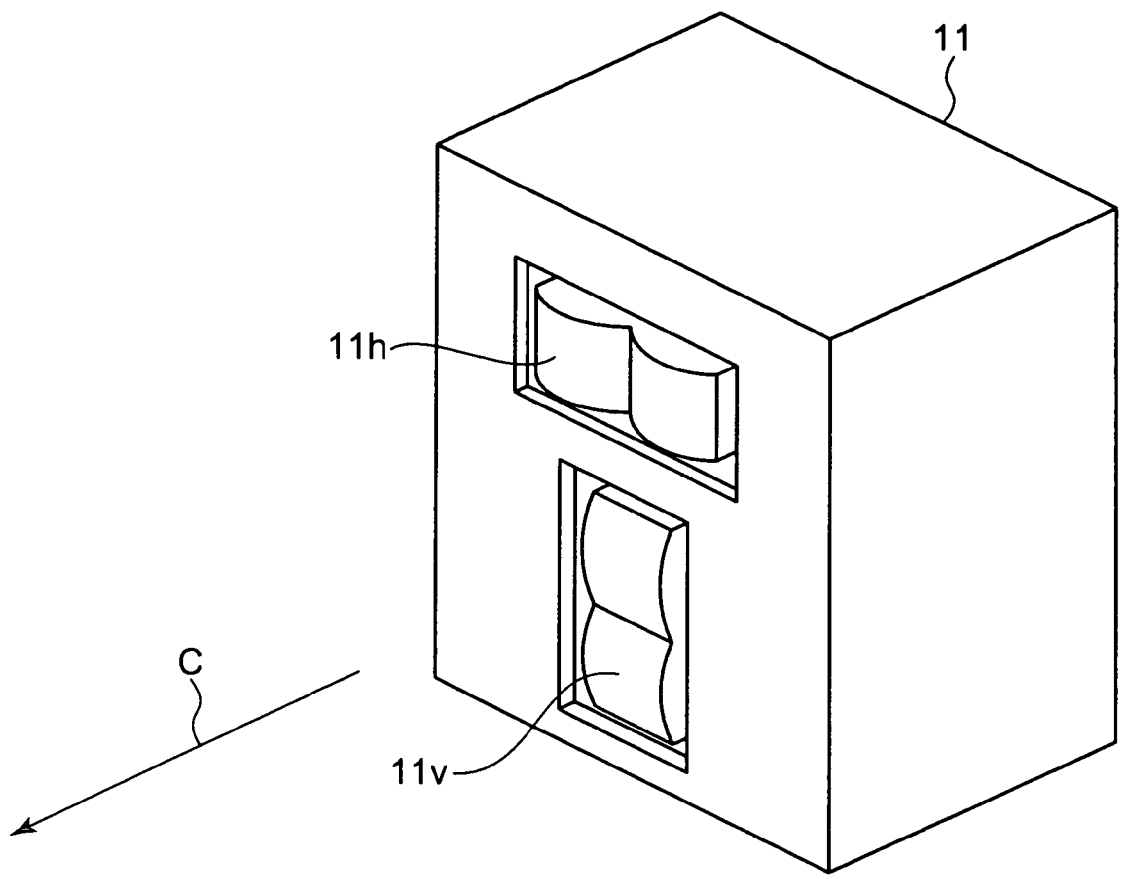
FIG. 2 is a perspective view showing the exterior of a distance measuring unit shown in FIG. 1.

The distance measuring unit 11 measures the distance from the projector 1 to a screen S. The distance measuring unit 11 is mounted to, for example, the front face of the projector 1. As shown in FIG. 2, AF sensor modules 11$h$, 11$v$ are disposed on the front face of the projector 1.

The AF sensor module 11$h$ measures the distances to horizontal distance measuring points Pos_L, Pos_R in a projection area A of the screen S, as shown in FIG. 3. The AF sensor module 11$v$ measures the distances to vertical distance measuring points Pos_U, Pos_D in the projection area A of the screen S. C is the center line in which the distance measuring unit 11 measures the distance of.

The distance-measuring-unit actuator 12 controls the state of the distance measuring unit 11. The distance-measuring-unit actuator 12 receives an elevation angle control signal from the control unit 17. Based on the elevation angle control signal, the distance-measuring-unit actuator 12 rotates the distance measuring unit 11 to control the elevation angle thereof.

The memory 13 stores image data supplied to the projector 1. The memory 13 also stores data necessary for the control operation of the control unit 17. The memory 13 stores table data as shown in FIG. 4.

The table data provides an elevation angle P at which the center line C of the distance measuring unit 11 corresponds to a center point Pos_C of the projection area of a projection image. This center point Pos_C of the projection area is determined according to a zoom magnification set by a zoom mechanism unit 14$c$. The elevation angle P is set so that the center line C of the distance measuring unit 11 passes the center point Pos_C of the projection area.

Zoom_t, Zoom_m, and Zoom_w respectively represent the zoom magnifications when the zoom is set to the telescopic, the middle, and the wide side. Pt, Pm and Pw respectively indicate elevation angles at the zoom magnifications Zoom_t, Zoom_m and Zoom_w. The table data is acquired empirically or by using other methods, beforehand.

The projection unit 14 projects an image on the screen S based on image data stored in the memory 13. The projection unit 14 includes a projection lens unit 14$a$, a focus motor 14$b$, the zoom mechanism unit 14$c$, and a zoom actuator 14$d$.

The projection lens unit 14$a$ forms a projection image on the screen S. The projection lens unit 14$a$ includes a plurality of lenses and performs focusing and zoom adjustment. A line which passes through the tip of the projection lens unit 14$a$ and through the center point of the projection area of the image projected onto the screen S, and the optical axis of the projection lens unit 14$a$ form a predetermined angle.

The focus motor 14$b$ controls the positions of the lenses of the projection lens unit 14$a$ under the control of the control unit 17. As a result, the projector 1 is focused.

The zoom mechanism unit 14$c$ adjusts the zoom of the projection lens unit 14$a$ by controlling the positions of the lenses of the projection lens unit 14$a$.

The zoom actuator 14$d$ drives the zoom mechanism unit 14$c$ in response to a zoom control signal supplied from the control unit 17.

The image processing unit 15 performs image processing, such as keystone correction, on image data stored in the memory 13. The image processing unit 15 executes keystone correction based on a horizontal set angle and a vertical set angle both supplied from the control unit 17.

The operation unit 16 acquires zoom magnification information set by a user. The operation unit 16 supplies the acquired zoom magnification information to the control unit 17.

The control unit 17 performs the general control of the projector 1. The control unit 17 includes a CPU, a ROM, and a RAM. Based on the zoom magnification information supplied from the operation unit 16, the control unit 17 supplies the zoom control signal to the zoom actuator 14$d$ so that the zoom magnification becomes the designated zoom magnification.

Referring to the table in the memory 13, the control unit 17 acquires the elevation angle P at which the center line C of the distance measuring unit 11 corresponds to the center point Pos_C of the projection area of the projection image, wherein the center point Pos_C is determined according to the zoom magnification set by the zoom mechanism unit 14$c$. Then, the control unit 17 supplies the elevation angle control signal to the distance-measuring-unit actuator 12 to provide the elevation angle P of the distance measuring unit 11.

The control unit 17 also performs auto focus control and keystone correction. In executing auto focus control, the control unit 17 controls the distance measuring unit 11 in such a way that the AF sensor module 11v of the distance measuring unit 11 measures the distance to the center point Pos_C of the projection area A.

The control unit 17 acquires the measured distance data from the AF sensor module 11v, and determines the focus position based on the acquired distance data to the center point Pos_C of the projection area A. Then, the control unit 17 controls the driving of the focus motor 14b of the projection unit 14 to provide the determined focus position.

In executing keystone correction, the control unit 17 first controls the distance measuring unit 11 so that the AF sensor module 11h of the distance measuring unit 11 measures the distances to the left and right distance measuring points Pos_L Pos_R.

The control unit 17 calculates the horizontal inclination angle of the screen S based on the distance data to the distance measuring points Pos_L, Pos_R measured by the AF sensor module 11h.

The control unit 17 then controls the distance measuring unit 11 so that the AF sensor module 11v measures the distances to the upward and downward distance measuring points Pos_U, Pos_D.

The control unit 17 acquires the measured distance data to the distance measuring points Pos_U, Pos_D from the AF sensor module 11v. The control unit 17 calculates the vertical inclination angle of the screen S based on the distance data to the distance measuring points Pos_U, Pos_D.

The control unit 17 calculates the horizontal set angle and the vertical set angle of the projector 1 based on the screen's two inclination angles orthogonal to each other, and the elevation angle P. The control unit 17 supplies the calculated horizontal set angle and vertical set angle to the image processing unit 15.

The operation of the projector 1 according to the embodiment will be explained below.

When the user supplies zoom magnification information of Zoom_t (telescopic) to the operation unit 16, the operation unit 16 supplies the zoom magnification information to the control unit 17.

Upon reception of the zoom magnification information, the control unit 17 controls the zoom actuator 14d so that the zoom magnification of the zoom mechanism unit 14c becomes Zoom_t. As a result, the height H, of the projection area of the projector 1 becomes Ht with respect to the lower end of the projection area as shown in FIGS. 5A and 5B.

The control unit 17 refers to the table data in the memory 13 shown in FIG. 4 to acquire the elevation angle Pt corresponding to the zoom magnification Zoom_t. The control unit 17 supplies an elevation angle control signal indicating the elevation angle Pt to the distance-measuring-unit actuator 12.

Figure 5A:
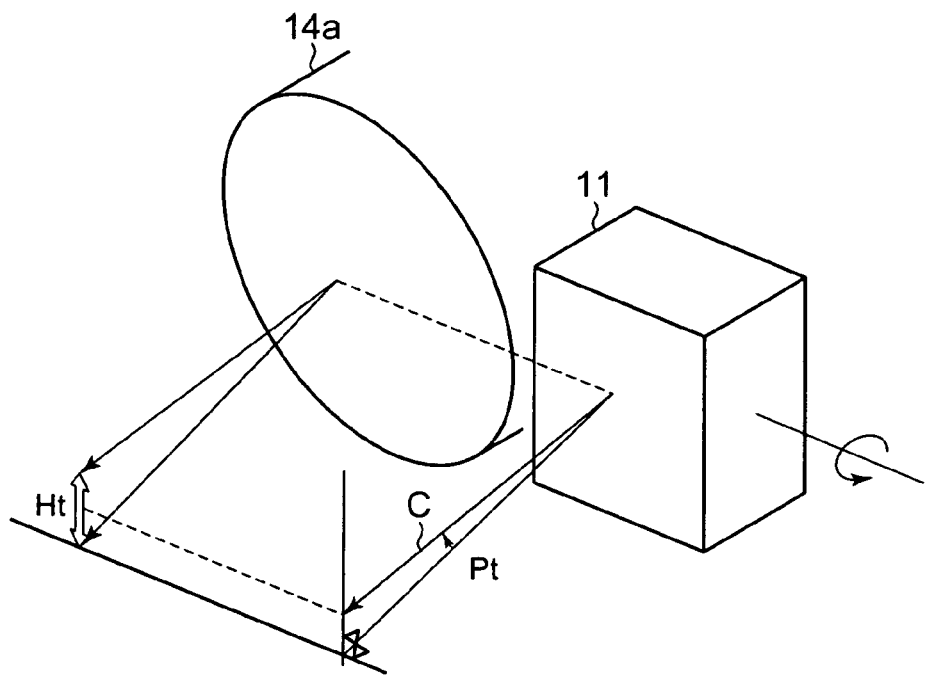
FIG. 5A is a diagram showing the distance measuring unit from the front, illustrating an operation when the zoom of the projector in FIG. 1 is set to the telescopic side.

In accordance with the elevation angle control signal, the distance-measuring-unit actuator 12 rotates the distance measuring unit 11 in an arrow direction shown in FIG. 5A. Accordingly, the center line C of the distance measuring unit 11 is directed upward by the elevation angle Pt with respect to the lower end of the projection area as shown in FIGS. 5A and 5B.

Figure 5B:
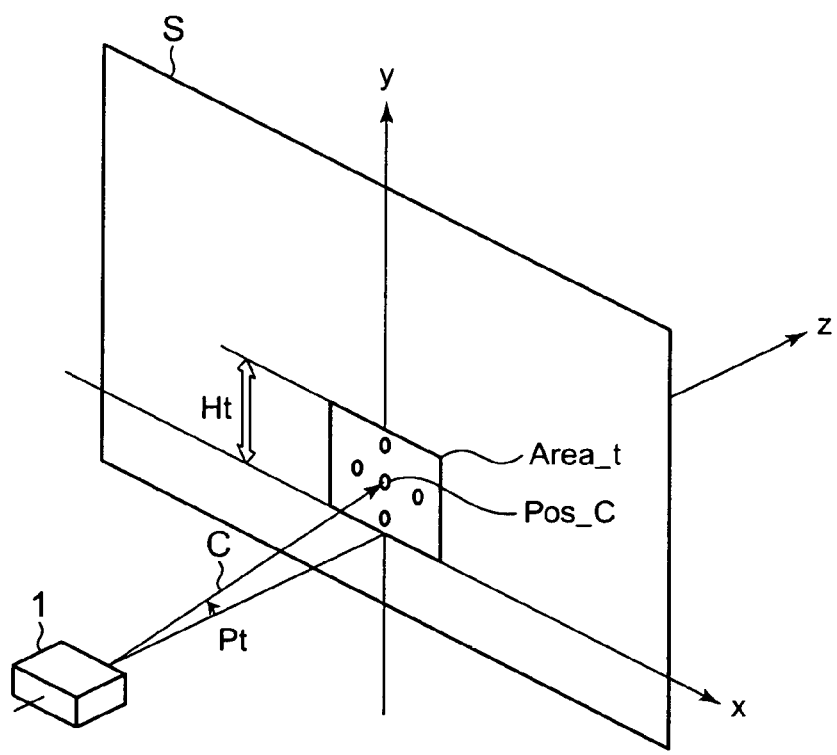
FIG. 5B is a diagram showing the relationship between a projection area and a distance measuring point in the center thereof, illustrating an operation when the zoom of the projector in FIG. 1 is set to the telescopic side.

As shown in FIG. 5B, the center line C of the distance measuring unit 11 passes the center point Pos_C of the projection area Area_t. Therefore, the distance measuring unit 11 accurately measures the distance to the projection area. Based on the measured distance, the control unit 17 controls the driving of the focus motor 14b of the projection unit 14 to execute accurate auto focus control.

The control unit 17 calculates the horizontal set angle and vertical set angle based on the screen's two orthogonal inclination angles and the elevation angle Pt, and supplies the calculated horizontal set angle and vertical set angle to the image processing unit 15.

The image processing unit 15 executes keystone correction based on the horizontal set angle and vertical set angle supplied from the control unit 17, and stores corrected image data in the memory 13. The projection unit 14 reads the data from the memory 13 and projects an image on the screen S based on the data.

Next, when the user supplies zoom magnification information of Zoom_m (middle) to the operation unit 16, the operation unit 16 supplies the zoom magnification information to the control unit 17.

Upon reception of the zoom magnification information, the control unit 17 controls the zoom actuator 14d so that the zoom magnification of the zoom mechanism unit 14c becomes Zoom_m. As a result, the height H of the projection area of the projector 1 becomes Hm with respect to the lower end of the projection area as shown in FIGS. 6A and 6B.

The control unit 17 refers to the table data in the memory 13 shown in FIG. 4 to acquire the elevation angle Pm corresponding to the zoom magnification Zoom_m. The control unit 17 supplies an elevation angle control signal indicating the elevation angle Pm to the distance-measuring-unit actuator 12.

Figure 6A:
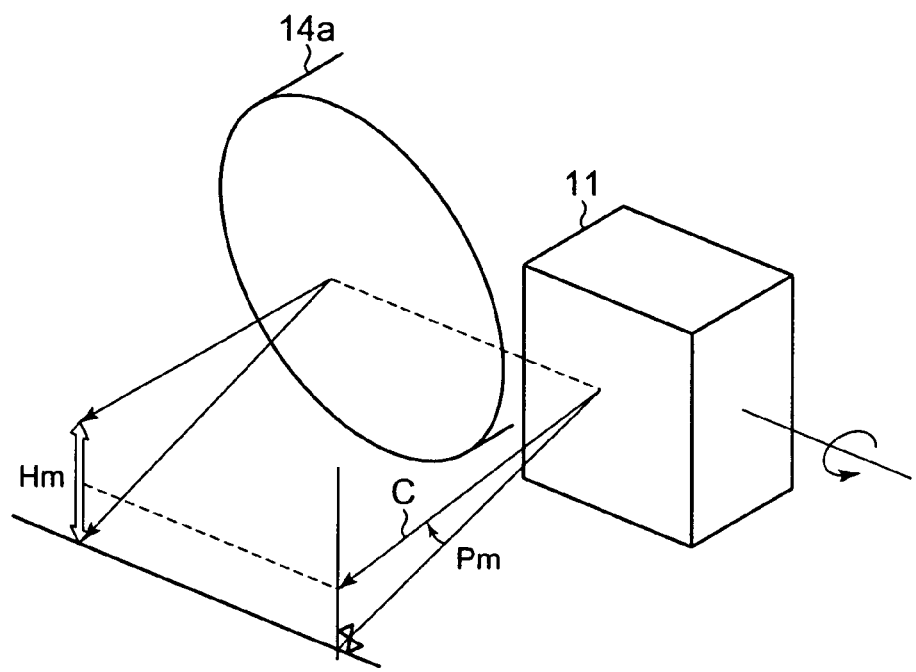
FIG. 6A is a diagram showing the distance measuring unit from the front, illustrating an operation when the zoom of the projector in FIG. 1 is set to the middle side.

In accordance with the elevation angle control signal, the distance-measuring-unit actuator 12 rotates the distance measuring unit 11 in an arrow direction shown in FIG. 6A. Accordingly, the center line C of the distance measuring unit 11 is directed upward by the elevation angle Pm with respect to the lower end of the projection area as shown in FIGS. 6A and 6B.

Figure 6B:
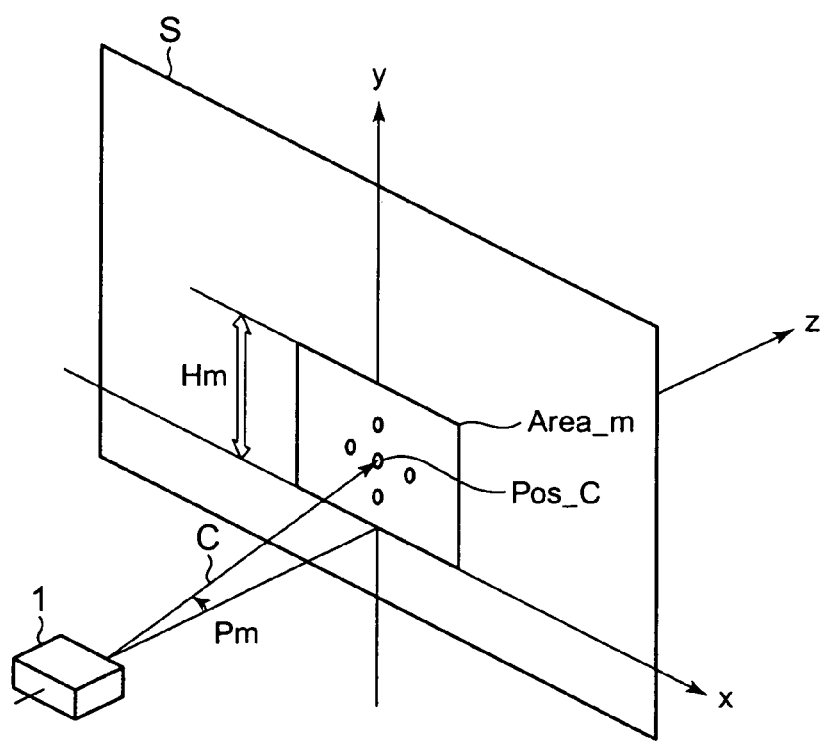
FIG. 6B is a diagram showing the relationship between a projection area and a distance measuring point in the center thereof, illustrating an operation when the zoom of the projector in FIG. 1 is set to the middle side.

As shown in FIG. 6B, the center line C of the distance measuring unit 11 passes the center point Pos_C of the projection area Area_m, so that the distance measuring unit 11 accurately measures the distance to the projection area. Based on the measured distance, the control unit 17 controls the driving of the focus motor 14b of the projection unit 14 to execute accurate auto focus control. The image processing unit 15 executes keystone correction based on the horizontal set angle and vertical set angle supplied from the control unit 17.

Next, when the user supplies zoom magnification information of Zoom_w (wide) to the operation unit 16, the operation unit 16 supplies the zoom magnification information to the control unit 17.

Upon reception of the zoom magnification information, the control unit 17 controls the zoom actuator 14d so that the zoom magnification of the zoom mechanism unit 14c becomes Zoom_w. As a result, the height H of the projection area of the projector 1 becomes Hw as shown in FIGS. 7A and 7B.

The control unit 17 refers to the table data in the memory 13 shown in FIG. 4 to acquire the elevation angle Pw corresponding to the zoom magnification Zoom_w. The control unit 17 supplies an elevation angle control signal indicating the elevation angle Pw to the distance-measuring-unit actuator 12.

Figure 7A:
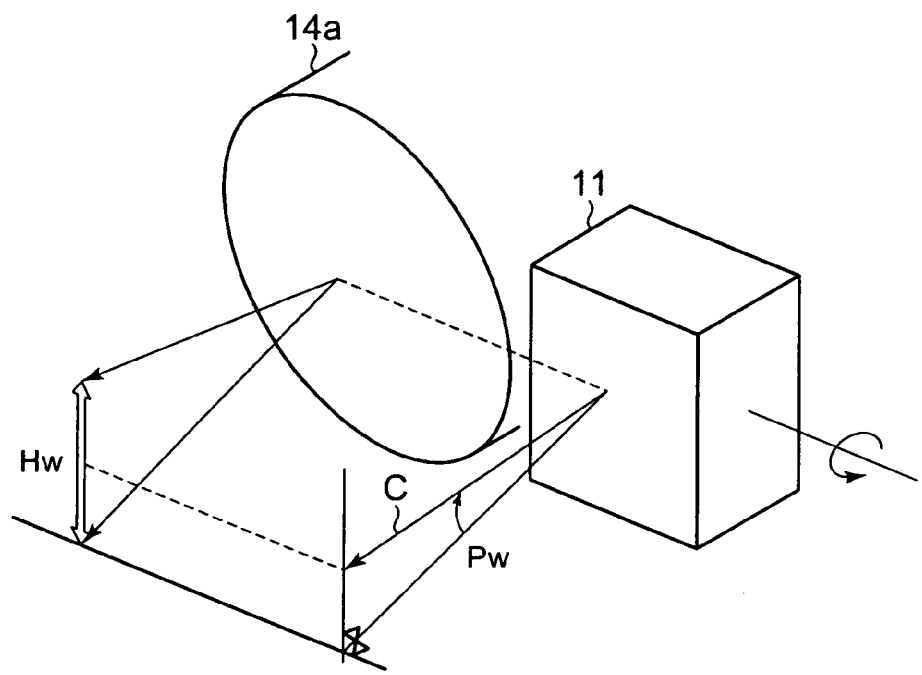
FIG. 7A is a diagram showing the distance measuring unit from the front, illustrating an operation when the zoom of the projector in FIG. 1 is set to the wide side.

In accordance with the elevation angle control signal, the distance-measuring-unit actuator 12 rotates the distance measuring unit 11 in an arrow direction shown in FIG. 7A. Accordingly, the center line C of the distance measuring unit 11 is directed upward by the elevation angle Pw with respect to the lower end of the projection area as shown in FIGS. 7A and 7B.

Figure 7B:
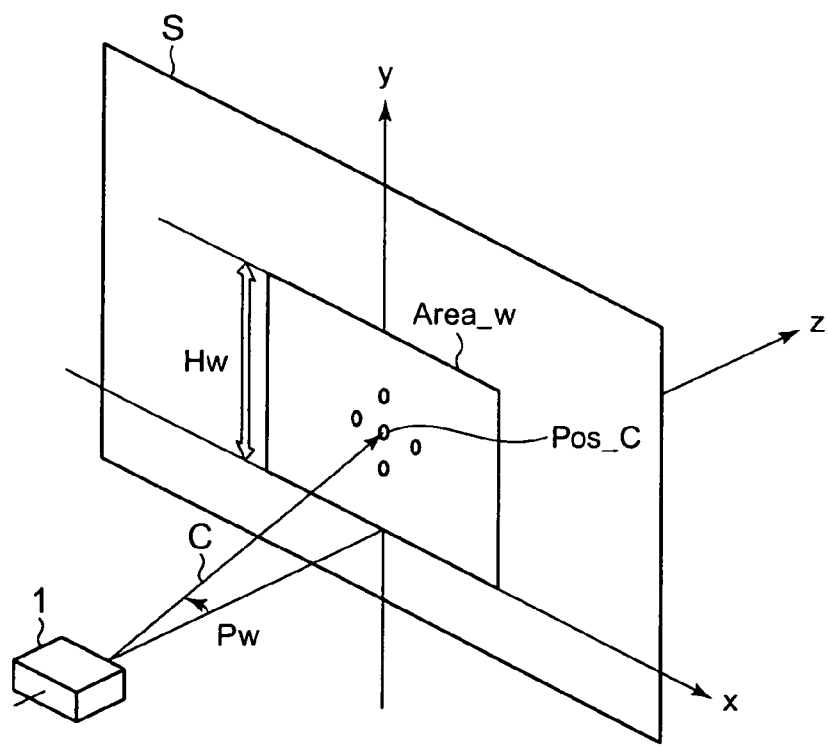
FIG. 7B is a diagram showing the relationship between a projection area and a distance measuring point in the center thereof, illustrating an operation when the zoom of the projector in FIG. 1 is set to the wide side.

As shown in FIG. 7B, the center line C of the distance measuring unit 11 passes the center point Pos_C of the projection area Area_w, so that the distance measuring unit 11 accurately measures the distance to the projection area. Based on the measured distance, the control unit 17 controls the driving of the focus motor 14b of the projection unit 14 to execute accurate auto focus control. The image processing unit 15 executes keystone correction based on the horizontal set angle and vertical set angle supplied from the control unit 17.

According to the embodiment, as described above, the control unit 17 drives the zoom actuator 14d and the distance-measuring-unit actuator 12 based on the zoom magnification information supplied from the operation unit 16 to make the elevation angle in the direction of the distance measuring center of the distance measuring unit 11 response to the zoom.

Even when the zoom magnification is changed, therefore, the center line C of the distance measuring unit 11 corresponds to the center point Pos_C of the projection area A that is determined by the zoom magnification set by the zoom mechanism unit 14c, and the center line C of the distance measuring unit 11 passes the center point Pos_C of the projection area A. This allows the projector 1 to precisely measure the distance to the projection area of the screen S, thus improving the accuracy of auto focus control.

Various embodiments are conceivable in working out the invention, which is not restrictive to the embodiment described above.

Figure 8A:
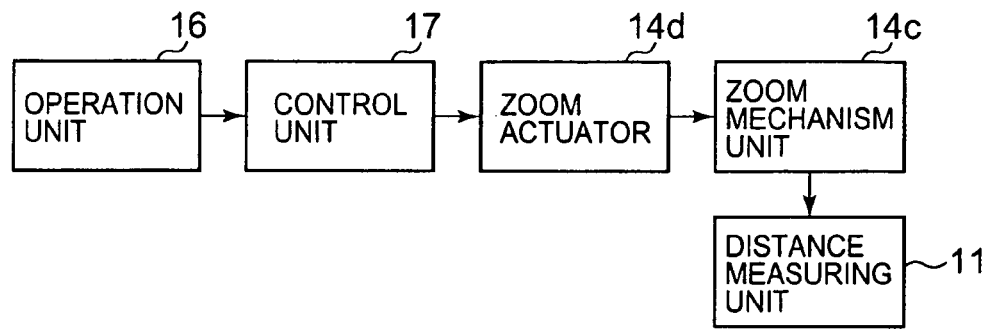
FIG. 8 is a block diagram showing an application example of a projector.

As shown in FIG. 8A, for example, the zoom mechanism unit 14c and the distance measuring unit 11 may be made to respond to each other mechanically.

In this case, the zoom mechanism unit 14c controls the elevation angle of the distance measuring unit 11 in such a way that the center line C of the distance measuring unit 11 corresponds to the center point Pos_C of the projection area A that is determined according to the set zoom magnification. This eliminates the need for an exclusive actuator for the distance measuring unit 11.

Figure 8B:
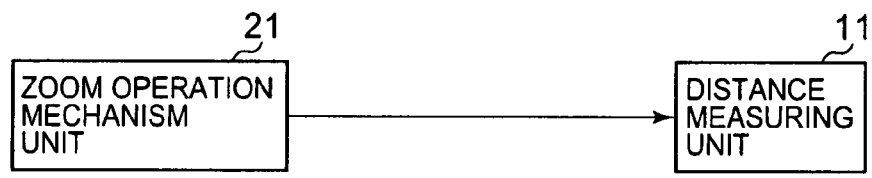
Figure 9:
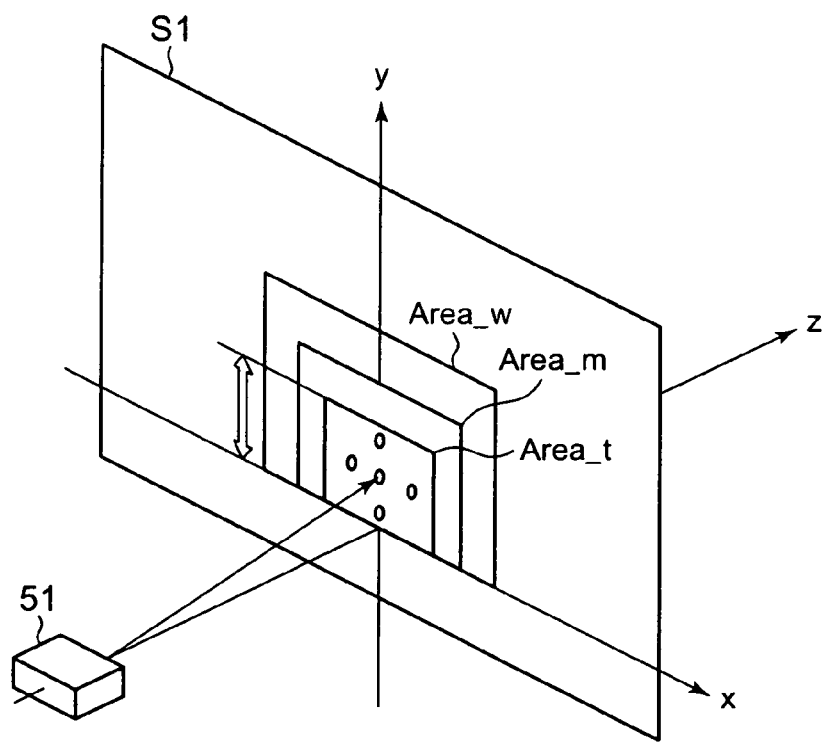
FIG. 9 is a diagram illustrating a conventional problem.

As shown in FIG. 8B, the zooming manipulation may be carried out manually and a zoom operation mechanism unit 21 therefor and the distance measuring unit 11 may be configured so as to respond to each other mechanically.

The embodiment has been given of the case where the projector 1 is provided with a distance measuring apparatus. The embodiment is not restrictive, but may be adapted to, for example, a camera whose distance measuring direction does not match with the optical axis from a subject.

Distance measuring unit may be configured to have a sufficiently wide distance measuring area, wherein the distance measuring direction is selectable and is electrically altered in response to a change in zooming. The distance measuring unit may control the distance measuring area in such a way that the distance measuring area will correspond with the projection area, so that information on the distance to the center of the projection area may be obtained without involving a mechanical structure for changing the elevation angle of the distance measuring unit.

Various embodiments and changes may be made thereunto without departing from the broad spirit and scope of the invention. The above-described embodiment is intended to illustrate the present invention, not to limit the scope of the present invention. The scope of the present invention is shown by the attached claims rather than the embodiment. Various modifications made within the meaning of an equivalent of the claims of the invention and within the claims are to be regarded to be in the scope of the present invention.

This application is based on Japanese Patent Application No. 2006-12646 filed on Jan. 20, 2006 and including the specification, claims, drawings and summary. The disclosure of the above Japanese Patent Application is incorporated herein by reference in its entirety.

What is claimed is:

1. A projection apparatus comprising:
   a distance measuring unit that measures a distance to a screen on which an image is to be projected;
   a projection unit that has a zoom mechanism unit capable of changing zoom magnifications of a projection image, focuses the projection image based on the distance measured by the distance measuring unit and projects the image on the screen; and
   an elevation angle control unit that controls an elevation angle of the distance measuring unit based on the zoom magnification set by the zoom mechanism unit in such a way that a distance measuring center line of the distance measuring unit corresponds to a center point of a projection area of the projection image, wherein the center point of the projection area is determined according to the zoom magnification of the zoom mechanism unit.

2. The projection apparatus according to claim 1, further comprising an operation unit for acquiring designated zoom magnification information,
   wherein the elevation angle control unit supplies the zoom magnification information acquired by the operation unit to the zoom mechanism unit, and controls the elevation angle of the distance measuring unit based on the zoom magnification information.

3. The projection apparatus according to claim 1, further comprising a storage unit that stores relationship information between the zoom magnification and the elevation angle of the distance measuring unit,
   wherein the elevation angle control unit controls the elevation angle of the distance measuring unit based on an elevation angle acquired by referring to the relationship information stored in the storage unit based on the zoom magnification set by the zoom mechanism unit.

4. The projection apparatus according to claim 1, wherein the projection unit comprises a projection lens which projects an image on the screen, and a line passing through a tip of the projection lens of the projection unit and through the center point of the projection area of the image projected onto the screen, and an optical axis of the projection lens of the projection unit form a predetermined angle.

5. A projection apparatus comprising:
   a distance measuring unit that measures a distance to a screen on which an image is to be projected; and
   a projection unit that has a zoom mechanism unit capable of changing zoom magnifications of a projection image, focuses the projection image based on the distance measured by the distance measuring unit and projects the image on the screen; and
   the zoom mechanism unit of the projection unit controls a distance measuring range of the distance measuring unit in such a way that a center point of the distance measuring range of the distance measuring unit corresponds to a center point of a projection area of the projection image, wherein the projection area is determined according to the set zoom magnification.

6. The projection apparatus according to claim 5, further comprising an operation unit for acquiring designated zoom magnification information, wherein the zoom mechanism unit sets the zoom magnification and controls the zoom magnification according to the zoom magnification information acquired by the operation unit.

7. The projection apparatus according to claim 5, wherein the projection unit comprises a projection lens which projects an image on the screen, and a line passing through a tip of the projection lens of the projection unit and through the center point of the projection area of the image projected onto the screen, and an optical axis of the projection lens of the projection unit form a predetermined angle.

8. An elevation angle control method for a projection apparatus which projects an image on a screen, comprising the steps of:

setting a zoom magnification when projecting the image on the screen; and controlling an elevation angle of a distance measuring center line in such a way that a distance measuring center line extending to the screen corresponds to a center point of a projection area of a projection image to be determined according to the set zoom magnification.

9. A computer readable recording medium storing a program for allowing a computer to execute:

a procedure of setting a zoom magnification when projecting the image on the screen; and controlling an elevation angle of a distance measuring center line in such a way that a distance measuring center line extending to the screen corresponds to a center point of a projection area of a projection image to be determined according to the set zoom magnification.

10. A projection apparatus comprising:

a distance measuring unit that measures a distance to a screen on which an image is to be projected; and a projection unit that comprises a zoom mechanism unit capable of changing zoom magnifications of a projection image, focuses the projection image based on the distance measured by the distance measuring unit, and projects the image on the screen; and the zoom mechanism unit of the projection unit that controls a distance measuring area of the distance measuring unit in such a way that the distance measuring area of the distance measuring unit approaches the projection area of the projection image, wherein the projection area is determined according to the set zoom magnification.

* * * * *